US008065231B1

(12) United States Patent
Loy (10) Patent No.: US 8,065,231 B1
(45) Date of Patent: Nov. 22, 2011

(54) TRADE RECEIVABLE PROCESSING METHOD AND APPARATUS

(75) Inventor: John J. Loy, Arlington Heights, IL (US)

(73) Assignee: JPMorgan Chase Bank, N.A., New York, NY (US)

( * ) Notice: Subject to any disclaimer, the term of this patent is extended or adjusted under 35 U.S.C. 154(b) by 127 days.

(21) Appl. No.: 12/580,696

(22) Filed: Oct. 16, 2009

Related U.S. Application Data (63) Continuation of application No. 11/932,637, filed on Oct. 31, 2007, now Pat. No. 7,680,735, which is a continuation of application No. 11/610,176, filed on Dec. 13, 2006, now Pat. No. 7,366,698, which is a continuation of application No. 10/085,977, filed on Feb. 28, 2002, now Pat. No. 7,546,272.

(60) Provisional application No. 60/224,706, filed on Aug. 11, 2000.

(51) Int. Cl.
*G06Q 40/00* (2006.01)
(52) U.S. Cl. .......................................... 705/40; 705/30
(58) Field of Classification Search ............... 705/10–44
See application file for complete search history.

(56) References Cited

U.S. PATENT DOCUMENTS

| | | |
|---|---|---|
| 3,653,480 A | 4/1972 | Yamamoto et al. |
| 4,050,375 A | 9/1977 | Orlens |
| 4,141,078 A | 2/1979 | Bridges et al. |
| 4,205,780 A | 6/1980 | Burns |
| 4,264,808 A | 4/1981 | Owens et al. |
| 4,321,672 A | 3/1982 | Braun et al. |
| 4,396,985 A | 8/1983 | Ohara |
| RE31,692 E | 10/1984 | Tyburski et al. |
| 4,495,018 A | 1/1985 | Vohrer |
| 4,617,457 A | 10/1986 | Myers |
| 4,672,377 A | 6/1987 | Murphy |
| 4,694,397 A | 9/1987 | Grant et al. |
| 4,700,055 A | 10/1987 | Kashkashian, Jr. |
| 4,713,761 A | 12/1987 | Sharpe et al. |
| 4,752,877 A | 6/1988 | Roberts et al. |
| 4,797,913 A | 1/1989 | Kaplan |
| 4,799,156 A | 1/1989 | Shavit |
| 4,807,177 A | 2/1989 | Ward |
| 4,812,628 A | 3/1989 | Boston |
| 4,823,264 A | 4/1989 | Deming |
| 4,893,333 A | 1/1990 | Baran et al. |
| 4,931,793 A | 6/1990 | Fuhrmann et al. |
| 4,939,674 A | 7/1990 | Price et al. |
| 4,948,174 A | 8/1990 | Thomson et al. |

(Continued)

FOREIGN PATENT DOCUMENTS
EP          421808         4/1991

(Continued)

OTHER PUBLICATIONS

Hunt, Robert M., An Introduction to the Economics of Payment Card Networks, Review of Network Economics, vol. 2, Issue 2, Jun. 2003.

(Continued)

*Primary Examiner* — Frantzy Poinvil
(74) *Attorney, Agent, or Firm* — Hunton & Williams LLP (57) ABSTRACT

A processing method and apparatus is provided, such as a clearinghouse, for tracking receivable and payable information, matching, negotiating, trading, providing working capital financing, and settling payments for accounts payable and accounts receivable between trading partners and finance providers.

15 Claims, 3 Drawing Sheets

U.S. PATENT DOCUMENTS

| | | |
|---|---|---|
| 4,974,878 A | 12/1990 | Josephson |
| 4,975,841 A | 12/1990 | Kehnemuyi et al. |
| 4,988,849 A | 1/1991 | Sasaki |
| 4,992,646 A | 2/1991 | Collin |
| 4,992,940 A | 2/1991 | Dworkin |
| 5,023,904 A | 6/1991 | Kaplan |
| 5,053,607 A | 10/1991 | Carlson |
| 5,054,096 A | 10/1991 | Beizer |
| 5,080,748 A | 1/1992 | Bonomi |
| 5,111,395 A | 5/1992 | Smith |
| 5,121,945 A | 6/1992 | Thomson et al. |
| 5,122,950 A | 6/1992 | Mee |
| 5,136,502 A | 8/1992 | Van Remortel et al. |
| 5,175,682 A | 12/1992 | Higashiyama |
| 5,187,750 A | 2/1993 | Behera |
| 5,198,975 A | 3/1993 | Baker et al. |
| 5,220,501 A | 6/1993 | Lawlor |
| 5,225,978 A | 7/1993 | Peterson |
| 5,237,159 A | 8/1993 | Stephens |
| 5,265,007 A | 11/1993 | Barnhard, Jr. et al. |
| 5,283,829 A | 2/1994 | Anderson |
| 5,287,269 A | 2/1994 | Dorrough et al. |
| 5,311,594 A | 5/1994 | Penzias |
| 5,315,508 A | 5/1994 | Bain et al. |
| 5,321,238 A | 6/1994 | Watanabe |
| 5,326,959 A | 7/1994 | Perazza |
| 5,336,870 A | 8/1994 | Hughes |
| 5,349,170 A | 9/1994 | Kern |
| 5,350,906 A | 9/1994 | Brody et al. |
| 5,367,581 A | 11/1994 | VanHorn |
| 5,373,550 A | 12/1994 | Campbell |
| 5,396,417 A | 3/1995 | Burks et al. |
| 5,402,474 A | 3/1995 | Miller |
| 5,412,190 A | 5/1995 | Kopesec |
| 5,424,938 A | 6/1995 | Wagner |
| 5,430,644 A | 7/1995 | Deaton et al. |
| 5,432,506 A | 7/1995 | Chapman |
| 5,444,794 A | 8/1995 | Uhland |
| 5,444,841 A | 8/1995 | Glasser et al. |
| 5,446,740 A | 8/1995 | Yien |
| 5,448,471 A | 9/1995 | Deaton et al. |
| 5,459,482 A | 10/1995 | Orlen |
| 5,465,206 A | 11/1995 | Hilt et al. |
| 5,477,040 A | 12/1995 | Lalonde |
| 5,479,494 A | 12/1995 | Clitherow |
| 5,483,445 A | 1/1996 | Pickering |
| 5,484,988 A | 1/1996 | Hills |
| 5,502,576 A | 3/1996 | Ramsay et al. |
| 5,504,677 A | 4/1996 | Pollin |
| 5,506,691 A | 4/1996 | Bednar et al. |
| 5,508,731 A | 4/1996 | Kohorn |
| 5,513,250 A | 4/1996 | McAllister |
| 5,532,464 A | 7/1996 | Josephson et al. |
| 5,544,043 A | 8/1996 | Miki et al. |
| 5,544,046 A | 8/1996 | Niwa |
| 5,550,734 A | 8/1996 | Tarter |
| 5,551,021 A | 8/1996 | Harada |
| 5,557,515 A | 9/1996 | Abbruzzese et al. |
| 5,563,400 A | 10/1996 | Le Roux |
| 5,566,330 A | 10/1996 | Sheffield |
| 5,568,489 A | 10/1996 | Yien |
| 5,570,465 A | 10/1996 | Tsakanikas |
| 5,572,004 A | 11/1996 | Raimann |
| 5,583,759 A | 12/1996 | Geer |
| 5,583,760 A | 12/1996 | Klesse |
| 5,590,196 A | 12/1996 | Moreau |
| 5,590,197 A | 12/1996 | Chen |
| 5,592,377 A | 1/1997 | Lipkin |
| 5,592,378 A | 1/1997 | Cameron |
| 5,599,528 A | 2/1997 | Igaki |
| 5,603,025 A | 2/1997 | Tabb |
| 5,615,109 A | 3/1997 | Eder |
| 5,619,558 A | 4/1997 | Jheeta |
| 5,621,201 A | 4/1997 | Langhans |
| 5,640,577 A | 6/1997 | Scharmer |
| 5,642,419 A | 6/1997 | Rosen |
| 5,644,778 A | 7/1997 | Burks et al. |
| 5,649,117 A | 7/1997 | Landry |
| 5,652,786 A | 7/1997 | Rogers |
| 5,659,165 A | 8/1997 | Jennings |
| 5,659,469 A | 8/1997 | Deaton et al. |
| 5,659,741 A | 8/1997 | Eberhardt |
| 5,666,493 A | 9/1997 | Wojcik et al. |
| 5,677,955 A | 10/1997 | Doggett et al. |
| 5,679,938 A | 10/1997 | Templeton |
| 5,679,940 A | 10/1997 | Templeton |
| 5,687,250 A | 11/1997 | Curley et al. |
| 5,692,132 A | 11/1997 | Hogan |
| 5,699,528 A | 12/1997 | Hogan |
| 5,703,344 A | 12/1997 | Bezy et al. |
| 5,704,044 A | 12/1997 | Tarter et al. |
| 5,708,422 A | 1/1998 | Blonder et al. |
| 5,715,298 A | 2/1998 | Rogers |
| 5,715,314 A | 2/1998 | Payne |
| 5,715,399 A | 2/1998 | Bezos |
| 5,717,989 A | 2/1998 | Tozzoli et al. |
| 5,724,424 A | 3/1998 | Gifford |
| 5,727,249 A | 3/1998 | Pollin |
| 5,748,780 A | 5/1998 | Stolfo |
| 5,751,842 A | 5/1998 | Riach et al. |
| 5,757,917 A | 5/1998 | Rose et al. |
| 5,770,843 A | 6/1998 | Rose et al. |
| 5,774,553 A | 6/1998 | Rosen |
| 5,783,808 A | 7/1998 | Josephson |
| 5,784,696 A | 7/1998 | Melnikof |
| 5,793,861 A | 8/1998 | Haigh |
| 5,794,221 A | 8/1998 | Egendorf |
| 5,802,498 A | 9/1998 | Comesanas |
| 5,802,499 A | 9/1998 | Sampson et al. |
| 5,819,236 A | 10/1998 | Josephson |
| 5,819,238 A | 10/1998 | Fernholz |
| 5,826,241 A | 10/1998 | Stein |
| 5,826,245 A | 10/1998 | Sandberg-Diment |
| 5,832,447 A | 11/1998 | Rieker |
| 5,832,460 A | 11/1998 | Bednar |
| 5,832,464 A | 11/1998 | Houvener et al. |
| 5,832,488 A | 11/1998 | Eberhardt |
| 5,835,580 A | 11/1998 | Fraser |
| 5,835,603 A | 11/1998 | Coutts |
| 5,835,899 A | 11/1998 | Rose et al. |
| 5,852,812 A | 12/1998 | Reeder |
| 5,859,419 A | 1/1999 | Wynn |
| 5,864,609 A | 1/1999 | Cross et al. |
| 5,870,456 A | 2/1999 | Rogers |
| 5,870,721 A | 2/1999 | Norris |
| 5,870,723 A | 2/1999 | Pare |
| 5,870,725 A | 2/1999 | Bellinger et al. |
| 5,873,072 A | 2/1999 | Kight |
| 5,878,141 A | 3/1999 | Daly et al. |
| 5,883,810 A | 3/1999 | Franklin et al. |
| 5,884,288 A | 3/1999 | Chang |
| 5,884,290 A | 3/1999 | Smorodinsky et al. |
| 5,897,625 A | 4/1999 | Gustin |
| 5,898,157 A | 4/1999 | Mangili et al. |
| 5,903,881 A | 5/1999 | Schrader |
| 5,910,896 A | 6/1999 | Hahn-Carlson |
| 5,910,988 A | 6/1999 | Ballard |
| 5,915,246 A | 6/1999 | Patterson et al. |
| 5,917,965 A | 6/1999 | Cahill et al. |
| 5,920,847 A | 7/1999 | Kolling et al. |
| 5,930,778 A | 7/1999 | Geer |
| 5,940,811 A | 8/1999 | Norris |
| 5,940,844 A | 8/1999 | Cahill et al. |
| 5,943,656 A | 8/1999 | Crooks |
| 5,945,653 A | 8/1999 | Walker et al. |
| 5,956,700 A | 9/1999 | Landry |
| 5,963,659 A | 10/1999 | Cahill et al. |
| 5,963,925 A | 10/1999 | Kolling et al. |
| 5,966,698 A | 10/1999 | Pollin |
| 5,978,780 A | 11/1999 | Watson |
| 5,987,435 A | 11/1999 | Weiss et al. |
| 5,987,436 A | 11/1999 | Halbrook |
| 5,987,439 A | 11/1999 | Gustin et al. |
| 5,991,750 A | 11/1999 | Watson |
| 6,000,832 A | 12/1999 | Franklin et al. |
| 6,003,762 A | 12/1999 | Hayashida |
| 6,006,208 A | 12/1999 | Forst et al. |

| | | | | | | |
|---|---|---|---|---|---|---|
| 6,009,442 | A | 12/1999 | Chen et al. | 6,363,164 B1 | 3/2002 | Jones et al. |
| 6,014,636 | A | 1/2000 | Reeder | 6,363,364 B1 | 3/2002 | Nel |
| 6,016,482 | A | 1/2000 | Molinari et al. | 6,363,365 B1 | 3/2002 | Kou |
| 6,016,484 | A | 1/2000 | Williams et al. | 6,366,967 B1 | 4/2002 | Wagner |
| 6,018,718 | A | 1/2000 | Walker et al. | 6,374,235 B1 | 4/2002 | Chen et al. |
| 6,026,388 | A | 2/2000 | Liddy et al. | 6,390,362 B1 | 5/2002 | Martin |
| 6,029,139 | A | 2/2000 | Cunningham et al. | 6,393,409 B2 | 5/2002 | Young et al. |
| 6,032,133 | A | 2/2000 | Hilt et al. | 6,405,173 B1 | 6/2002 | Honarvar et al. |
| 6,032,137 | A | 2/2000 | Hallard | 6,415,259 B1 | 7/2002 | Wolfinger et al. |
| 6,035,281 | A | 3/2000 | Crosskey et al. | 6,418,419 B1 | 7/2002 | Nieboer et al. |
| 6,035,285 | A | 3/2000 | Schlect et al. | 6,418,420 B1 | 7/2002 | DiGiorgio et al. |
| 6,035,287 | A | 3/2000 | Stallaert et al. | 6,418,430 B1 | 7/2002 | DeFazio et al. |
| 6,038,553 | A | 3/2000 | Hyde, Jr. | 6,434,159 B1 | 8/2002 | Woodward et al. |
| 6,041,312 | A | 3/2000 | Bickerton et al. | 6,446,072 B1 | 9/2002 | Schulze et al. |
| 6,041,315 | A | 3/2000 | Pollin | 6,460,020 B1 | 10/2002 | Pool et al. |
| 6,044,362 | A | 3/2000 | Neely | 6,490,568 B1 | 12/2002 | Omara et al. |
| 6,045,039 | A | 4/2000 | Stinson et al. | 6,493,685 B1 | 12/2002 | Ensel et al. |
| 6,047,261 | A | 4/2000 | Siefert | 6,535,896 B2 | 3/2003 | Britton et al. |
| 6,052,674 | A | 4/2000 | Zervides et al. | 6,536,663 B1 | 3/2003 | Lozier et al. |
| 6,058,380 | A | 5/2000 | Anderson et al. | 6,554,185 B1 | 4/2003 | Montross et al. |
| 6,058,381 | A | 5/2000 | Nelson | 6,574,350 B1 | 6/2003 | Rhoads et al. |
| 6,061,665 | A | 5/2000 | Bahreman | 6,574,377 B1 | 6/2003 | Cahill et al. |
| 6,064,764 | A | 5/2000 | Bhaskaran et al. | 6,578,000 B1 | 6/2003 | Dodrill et al. |
| 6,064,987 | A | 5/2000 | Walker et al. | 6,578,015 B1 | 6/2003 | Haseltine et al. |
| 6,065,675 | A | 5/2000 | Teicher | 6,609,113 B1 | 8/2003 | O'Leary et al. |
| 6,067,524 | A | 5/2000 | Byerly et al. | 6,609,125 B1 | 8/2003 | Layne et al. |
| 6,070,150 | A | 5/2000 | Remington et al. | 6,629,081 B1 | 9/2003 | Cornelius et al. |
| 6,070,798 | A | 6/2000 | Nethery | 6,636,615 B1 | 10/2003 | Rhoads et al. |
| 6,073,104 | A | 6/2000 | Field | 6,658,393 B1 | 12/2003 | Basch et al. |
| 6,073,113 | A | 6/2000 | Guinan | 6,661,910 B2 | 12/2003 | Jones et al. |
| 6,076,072 | A | 6/2000 | Libman | 6,704,714 B1 | 3/2004 | O'Leary et al. |
| 6,078,907 | A | 6/2000 | Lamm | 6,721,715 B2 | 4/2004 | Nemzow |
| 6,081,790 | A | 6/2000 | Rosen | 6,728,397 B2 | 4/2004 | McNeal |
| 6,085,168 | A | 7/2000 | Mori et al. | 6,820,058 B2 | 11/2004 | Wood et al. |
| 6,088,683 | A | 7/2000 | Jalili | 6,825,940 B1 | 11/2004 | Wu et al. |
| 6,088,685 | A | 7/2000 | Kiron et al. | 6,860,375 B2 | 3/2005 | Hallowell et al. |
| 6,088,686 | A | 7/2000 | Walker et al. | 6,954,896 B1 | 10/2005 | Dodrill et al. |
| 6,092,056 | A | 7/2000 | Tull, Jr. et al. | 6,965,882 B1 | 11/2005 | Lapstun et al. |
| 6,098,053 | A | 8/2000 | Slater | 6,970,259 B1 | 11/2005 | Lunt et al. |
| 6,098,070 | A | 8/2000 | Maxwell | 6,970,855 B2 | 11/2005 | Das et al. |
| 6,105,011 | A | 8/2000 | Morrison, Jr. | RE38,957 E | 1/2006 | Laussermair et al. |
| 6,108,639 | A | 8/2000 | Walker et al. | 6,999,943 B1 | 2/2006 | Johnson et al. |
| 6,110,044 | A | 8/2000 | Stern | 7,004,382 B2 | 2/2006 | Sandru |
| 6,111,858 | A | 8/2000 | Greaves et al. | 7,062,456 B1 | 6/2006 | Riehl et al. |
| 6,115,690 | A | 9/2000 | Wong | 7,068,832 B1 | 6/2006 | Price et al. |
| 6,119,106 | A | 9/2000 | Mersky et al. | 7,104,443 B1 | 9/2006 | Paul et al. |
| 6,119,107 | A | 9/2000 | Polk | 7,133,835 B1 * | 11/2006 | Fusz et al. .................... 705/26.3 |
| 6,125,354 | A | 9/2000 | MacFarlane et al. | 7,133,846 B1 | 11/2006 | Ginter et al. |
| 6,128,602 | A | 10/2000 | Northington et al. | 7,177,836 B1 | 2/2007 | German et al. |
| 6,128,603 | A | 10/2000 | Dent et al. | 7,194,437 B1 | 3/2007 | Britto et al. |
| 6,129,273 | A | 10/2000 | Shah | 7,200,255 B2 | 4/2007 | Jones et al. |
| 6,138,118 | A | 10/2000 | Koppstein et al. | 7,313,543 B1 | 12/2007 | Crane et al. |
| 6,144,946 | A | 11/2000 | Iwamura | 7,317,823 B1 | 1/2008 | Price et al. |
| 6,148,293 | A | 11/2000 | King | 7,328,211 B2 | 2/2008 | Bordner |
| 6,149,055 | A | 11/2000 | Gatto | 7,337,148 B2 | 2/2008 | Xie et al. |
| 6,149,056 | A | 11/2000 | Stinson et al. | 7,349,884 B1 | 3/2008 | Odom |
| 6,167,385 | A | 12/2000 | Hartley-Urquhart | 7,380,707 B1 | 6/2008 | Fredman |
| 6,173,272 | B1 | 1/2001 | Thomas et al. | 7,401,048 B2 | 7/2008 | Rosedale et al. |
| 6,181,837 | B1 | 1/2001 | Cahill et al. | 2001/0011222 A1 | 8/2001 | McLauchlin et al. |
| 6,185,544 | B1 | 2/2001 | Sakamoto et al. | 2001/0018666 A1 | 8/2001 | Sugiyama et al. |
| 6,202,054 | B1 | 3/2001 | Lawlor et al. | 2001/0018739 A1 | 8/2001 | Anderson et al. |
| 6,205,433 | B1 | 3/2001 | Boesch et al. | 2001/0032139 A1 | 10/2001 | Debonnett, Jr. |
| 6,213,391 | B1 | 4/2001 | Lewis | 2001/0037300 A1 | 11/2001 | Miyazaki et al. |
| 6,227,447 | B1 | 5/2001 | Campisano | 2001/0037309 A1 | 11/2001 | Vrain |
| 6,233,565 | B1 | 5/2001 | Lewis et al. | 2001/0047334 A1 | 11/2001 | Nappe et al. |
| 6,233,566 | B1 | 5/2001 | Levine et al. | 2001/0047489 A1 | 11/2001 | Ito et al. |
| 6,236,972 | B1 | 5/2001 | Shkedy | 2001/0051533 A1 | 12/2001 | Wietzke et al. |
| 6,240,444 | B1 | 5/2001 | Fin et al. | 2002/0012445 A1 | 1/2002 | Perry |
| 6,278,981 | B1 | 8/2001 | Dembo et al. | 2002/0013728 A1 | 1/2002 | Wilkman |
| 6,289,322 | B1 | 9/2001 | Kitchen et al. | 2002/0023055 A1 | 2/2002 | Antognini et al. |
| 6,292,789 | B1 | 9/2001 | Schutzer | 2002/0026394 A1 | 2/2002 | Savage et al. |
| 6,301,379 | B1 | 10/2001 | Thompson et al. | 2002/0038363 A1 | 3/2002 | MacLean |
| 6,301,567 | B1 | 10/2001 | Leong et al. | 2002/0046169 A1 | 4/2002 | Keresman, III et al. |
| 6,304,858 | B1 | 10/2001 | Mosler et al. | 2002/0052842 A1 | 5/2002 | Schuba et al. |
| 6,321,212 | B1 | 11/2001 | Lange | 2002/0055907 A1 | 5/2002 | Pater et al. |
| 6,324,524 | B1 | 11/2001 | Lent et al. | 2002/0069134 A1 | 6/2002 | Solomon |
| 6,338,047 | B1 | 1/2002 | Wallman | 2002/0072976 A1 | 6/2002 | Virtanen et al. |
| 6,338,049 | B1 | 1/2002 | Walker et al. | 2002/0077978 A1 | 6/2002 | O'Leary et al. |
| 6,343,279 | B1 | 1/2002 | Bissonette et al. | 2002/0082985 A1 | 6/2002 | MacKay |

| | | | |
|---|---|---|---|
| 2002/0087415 A1 | 7/2002 | Allen et al. | |
| 2002/0087468 A1 | 7/2002 | Ganesan et al. | |
| 2002/0087469 A1 | 7/2002 | Ganesan et al. | |
| 2002/0091635 A1 | 7/2002 | Dilip et al. | |
| 2002/0100803 A1 | 8/2002 | Sehr | |
| 2002/0107770 A1 | 8/2002 | Meyer et al. | |
| 2002/0107788 A1 | 8/2002 | Cunningham | |
| 2002/0111837 A1 | 8/2002 | Aupperle | |
| 2002/0128981 A1 | 9/2002 | Kawan et al. | |
| 2002/0138398 A1 | 9/2002 | Kalin et al. | |
| 2002/0169658 A1 | 11/2002 | Adler | |
| 2002/0170966 A1 | 11/2002 | Hannigan et al. | |
| 2002/0178071 A1 | 11/2002 | Walker et al. | |
| 2002/0184151 A1 | 12/2002 | Maloney | |
| 2002/0194096 A1 | 12/2002 | Falcone et al. | |
| 2002/0198817 A1 | 12/2002 | Dhir | |
| 2002/0199182 A1 | 12/2002 | Whitehead | |
| 2003/0018557 A1 | 1/2003 | Gilbert et al. | |
| 2003/0037002 A1 | 2/2003 | Higgins et al. | |
| 2003/0040959 A1 | 2/2003 | Fei et al. | |
| 2003/0046218 A1 | 3/2003 | Albanese et al. | |
| 2003/0055675 A1 | 3/2003 | Klein Twennaar | |
| 2003/0069780 A1 | 4/2003 | Hailwood et al. | |
| 2003/0097335 A1 | 5/2003 | Moskowitz et al. | |
| 2003/0105641 A1 | 6/2003 | Lewis | |
| 2003/0110442 A1 | 6/2003 | Battle | |
| 2003/0120686 A1 | 6/2003 | Kim et al. | |
| 2003/0130945 A1 | 7/2003 | Force et al. | |
| 2003/0130952 A1 | 7/2003 | Bell et al. | |
| 2003/0144942 A1 | 7/2003 | Sobek | |
| 2003/0187789 A1 | 10/2003 | Karas et al. | |
| 2003/0191710 A1 | 10/2003 | Green et al. | |
| 2003/0200107 A1 | 10/2003 | Allen et al. | |
| 2003/0208421 A1 | 11/2003 | Vicknair et al. | |
| 2003/0208441 A1 | 11/2003 | Poplawski et al. | |
| 2003/0225663 A1 | 12/2003 | Horan et al. | |
| 2003/0233305 A1 | 12/2003 | Solomon | |
| 2003/0237046 A1 | 12/2003 | Parker et al. | |
| 2004/0064409 A1 | 4/2004 | Kight et al. | |
| 2004/0078328 A1 | 4/2004 | Talbert et al. | |
| 2004/0133516 A1 | 7/2004 | Buchanan et al. | |
| 2004/0201735 A1 | 10/2004 | Baron | |
| 2004/0228514 A1 | 11/2004 | Houle et al. | |
| 2005/0033361 A1 | 2/2005 | Antognini et al. | |
| 2005/0055254 A1 | 3/2005 | Schmidtberg et al. | |
| 2005/0086178 A1 | 4/2005 | Xie et al. | |
| 2005/0091156 A1 | 4/2005 | Hailwood et al. | |
| 2005/0097050 A1 | 5/2005 | Orcutt | |
| 2005/0144059 A1 | 6/2005 | Schuessler | |
| 2005/0177480 A1 | 8/2005 | Huang | |
| 2005/0209954 A1 | 9/2005 | Asher et al. | |
| 2005/0261955 A1 | 11/2005 | Humble et al. | |
| 2006/0095374 A1 | 5/2006 | Lo | |
| 2006/0106650 A1 | 5/2006 | Bush | |
| 2006/0106717 A1 | 5/2006 | Randle et al. | |
| 2006/0136335 A1 | 6/2006 | Ferguson, III | |
| 2006/0178986 A1 | 8/2006 | Giordano et al. | |
| 2006/0206427 A1 | 9/2006 | Love et al. | |
| 2006/0282389 A1 | 12/2006 | Gupte | |
| 2006/0287953 A1 | 12/2006 | Chauhan | |
| 2007/0061260 A1 | 3/2007 | DeGrove | |
| 2007/0192216 A1 | 8/2007 | Arnold | |
| 2008/0133522 A1 | 6/2008 | Bordner | |
| 2008/0193008 A1 | 8/2008 | Mount et al. | |
| 2009/0150370 A1 | 6/2009 | Christensen | |

FOREIGN PATENT DOCUMENTS

| | | |
|---|---|---|
| EP | 1014318 | 6/2000 |
| WO | WO 91/16691 | 10/1991 |
| WO | WO 93/08545 | 4/1993 |
| WO | WO 94/28497 | 12/1994 |
| WO | WO 96/08783 | 3/1996 |
| WO | WO 96/12242 A1 | 4/1996 |
| WO | WO 97/14108 | 4/1997 |
| WO | WO 97/45796 | 12/1997 |
| WO | WO 97/45814 | 12/1997 |
| WO | WO 98/09260 | 3/1998 |
| WO | WO 99/10823 | 3/1999 |
| WO | WO 00/39979 | 7/2000 |
| WO | WO 01/75730 A2 | 10/2001 |
| WO | WO 02/063432 A2 | 8/2002 |
| WO | WO 2004-079603 | 9/2004 |

OTHER PUBLICATIONS

Annual Report Pursuant to Sectin 13 or 15(d) of The Securities Exchange Act of 1934, Form 10-K, Intelidata Technologies Corporation, Fiscal Year Ended Dec. 31, 2001.

Blockbuster running test of a stored value card, The American Banker, Sep. 1, 1995.

CES/NaBANCO introduces stored value card technology blockbuster video is first merchant partner, Business Wire, Inc., Jan. 15, 1996.

Card Flash Daily Payment Card News, www.cardweb.com, printed Sep. 23, 2004.

Anonymous, Chase Manhattan introduces new FEDI payables product, ProQuest document ID: 7806951, ISSN/ISBN: 02686635, May 1995.

Bills, Chase Pact Done, What's Next for Web Vendors?, The American Banker, Technology Section, Jun. 3, 2002, p. 23.

Reinbach, Chase steps up treasury system, ProQuest documednt ID 8723558, ISSN/ISBN: 10459472, Nov. 1995.

Anonymous, Chasing the global trend, Cash Management News, proQuest document ID 9319923, ISSN/ISBN: 02686635, Dec. 1995.

Malhotra, Clearing House Enumerates e-Payments IIIs, The American Banker, vol. 167, No. 154, Aug. 23, 2002.

Marjanovic, Corporate Services: Chase Gears Up Global Payments System Series: 16, The American Banker, vol. 160, Issue 174, Sep. 11, 1995, p. 41.

Gluck, Creating a Global Cash-Management Game Plan, Bank Systems & Technology, Feb. 1997, p. 28.

Lamond, Credit Card Transactions Real World and Online, Paying by Credit Card-Real World and Online, http://www.virtualschool.edu/mon/ElectronicProperty/klamond/credit, printed Jul. 8, 2005, 17 pages.

Lamond, Keith, Credit Card Transactions Real World and Online, http://www.virtualschool.edu/mon/ElectronicProperty/klamond/credit_card.htm, pp. 1-17, printed Jul. 8, 2005.

Dialog file 20, #10279554; Offer: Book Yourself Free Cassettes; Mar. 25, 2000; Birmingham Post, p. 16.

Du Pont's Electronic Payments, Corporate EFT Report, v9, n1, Dialog file 636, Accession No. 01066902, Jan. 11, 1989.

Carreker, Electronic check presentment: Capturing new technology, http://proquest.umi.com, Banking Management, Rolling Meadows: vol. 71, Issue 2, Mar./Apr. 1995, p. 32, 5 pages.

Fidelity Helps Fund Sellers Trim the Taxes They'll Owe, The Wall Street Journal, Nov. 7, 2002.

First Data markets stored-value cards, Cards International, Jan. 30, 1996, p. 5.

Norris, First data unit develops blockbuster cash card, Omaha World Hearld Sunrise Edition, Business Section, Jan. 19, 1996, p. 16.

Harsh Truth: Your Investments Likely Won't Make Any Money.

Money, Initial Launch to 200 Credit Unions, USA Today.com, Jun. 27, 2002.

Decovny, Net Scope, Banking Technology, May 1997.

Nokia Announces the World's First NFC Enabled Mobile Product for Contactless Payment and Ticketing, PRNewswire, Feb. 9, 2005.

Armstrong, Douglas, "Norwest Eases difficulty of Interstate Banking Bank's Customers May Use the Same Account Number at Any Branch", Milwaukee Journal Sentinel, Oct. 1995.

Goode, On Profit, Loss and the Mysteries of the Mind, The New York Times, Nov. 5, 2002.

Anonymous, Operating in a multi-currency environment, ProQuest document ID 9215937, ISSN/ISBN 09589309, Oct. 1995.

Maher and Troutman, Payor's Prescription for Painless Migration to Electronic Healthcare Payments and Remittance Advices, PNC Bank, Dec. 2001.

Maturi, Richard, "Personal Finance; When you Need to Send Cash in a Flash", The New York Times, Sep. 1988.

Press Release, Mar. 5, 2004, Payment Data Systems Files Patent on Debit Card Payment Solution, American City Business Journals, Inc., Mar. 5, 2004.

Maher and Troutman, Provider's Prescription for Painless Migration to Receipt of Electronic Healthcare Payments and Remittance Advices, PNC Bank, Dec. 2001.

Anonymous, Systems spell change for foreign exchange, Global Investor, ProQuest document ID 1056152B, ISSN/ISBN: 09513604, Nov. 1996.

French, Tech Stocks: Market Movers, Investors Worry CheckFree Being Chased from Its Own Game, http://www.thestreet.com, Jun. 20, 2002.

Technology, In Brief Wachovia-InteliData Deal, May 7, 2002.

Zuckerman, The Hedge-Fund Craze, The Wall Street Journal, Jun. 12, 2002.

McDonald, The Stars in the Sky Flicker, and Fund Stars Do the Same, The Wall Street Journal, Jan. 15, 2003.

Anonymous, Visa & Carnegie Mellon Plan Online Payment Scheme, Newsbyte News Network, Feb. 15, 1995.

Financial News, Wells Fargo Rolls Out Nationwide Lockbox Check Conversion, PR Newswire Association, Apr. 22, 2003.

Terrie Miller and Henry Yan, When Custody Governs, Benefits Canada, Toronto, Feb. 1998, vol. 22, Issue 2, p. 33, 5 pages.

* cited by examiner

FIG.3

TRADE RECEIVABLE PROCESSING METHOD AND APPARATUS

RELATED APPLICATIONS

This application is a continuation of and claims priority to U.S. patent application Ser. No. 11/932,637, now U.S. Pat. No. 7,680,735, filed on Oct. 31, 2007, entitled "Trade Receivable Processing Method and Apparatus," which is a continuation of and claims priority to U.S. patent application Ser. No. 11/610,176, now U.S. Pat. No. 7,366,698, filed on Dec. 13, 2006, entitled "Trade Receivable Processing Method and Apparatus," which is a continuation of and claims priority to U.S. patent application Ser. No. 10/085,977, now U.S. Pat. No. 7,546,272, entitled "Trade Receivable Processing Method and Apparatus," which claims the benefit of U.S. Provisional Application Ser. No. 60/224,706, filed Aug. 11, 2000. The disclosure of these priority applications are incorporated herein by reference.

TECHNICAL FIELD

The present invention relates generally to a trade receivable processing method and apparatus, and in particular, to a method and apparatus such as a clearing center for performing one or more services related to tracking summary receivable and payable information, and matching, negotiating, trading, financing, and settling payments for accounts payable and accounts receivable between trading partners and finance providers.

BACKGROUND OF THE INVENTION

Figure 1:
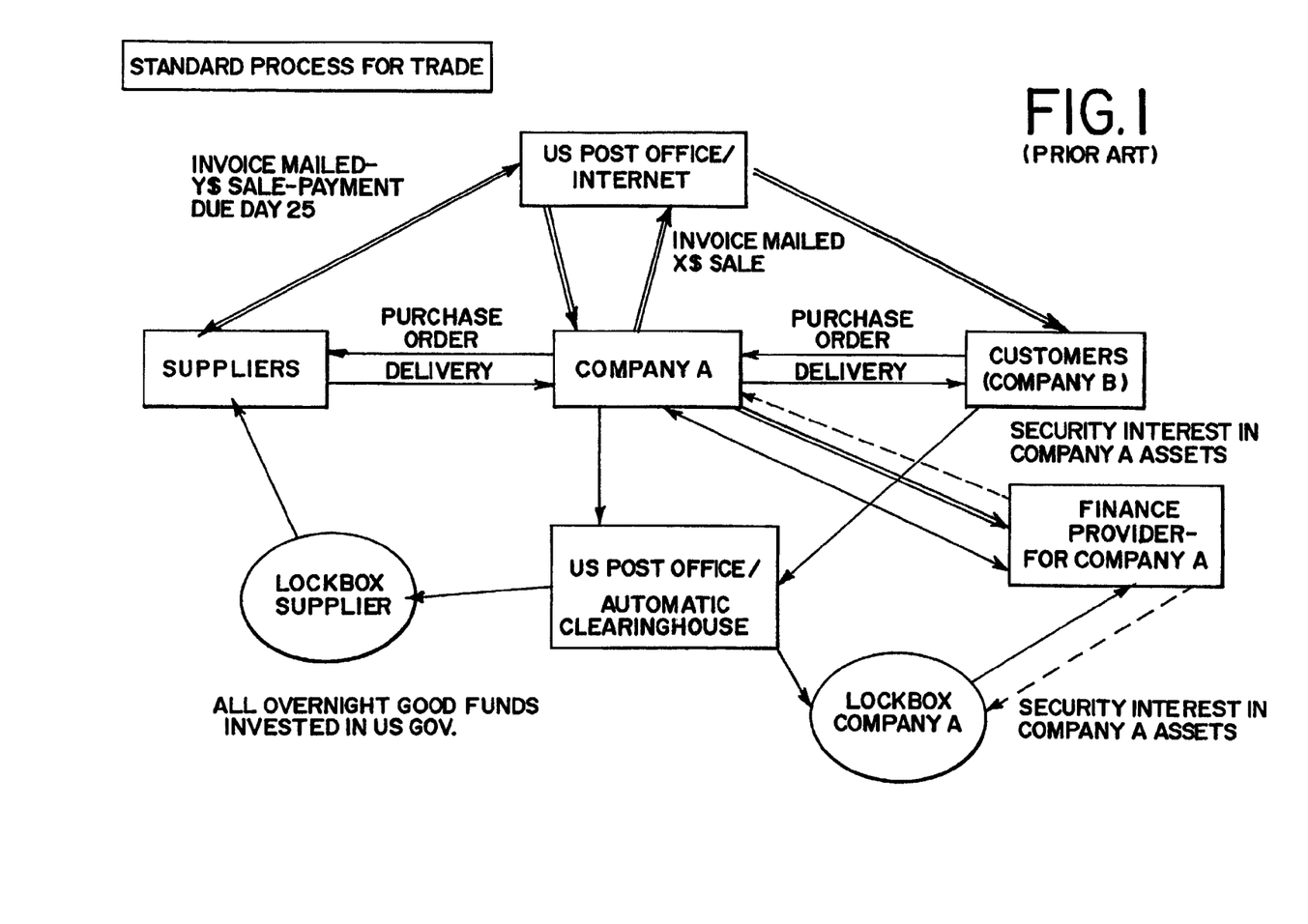
FIG. 1 is a simplified flow diagram of a prior art standard trade receivable payment process.

Typically, as shown in FIG. 1, upon the receipt and initial processing of a purchase order (typically paper), the seller of the goods (Company A) ships the goods to the buyer/customer (Company B), and mails to the buyer (Company B) an invoice. Terms of payment are stated on the invoice, with mailing instructions—typically to a lockbox address if Company A has sufficient volume. Costs incurred by Company A to invoice include printing, envelopes, and mailing. Costs to Company B include creating and printing the check, envelope and mailing costs.

The lockbox bank, on behalf of Company A, receives the mail sent to the lockbox, opens the envelopes, sorts out the non-invoice letters, sorts invoices, deposits the checks, and sends to Company A the non-invoice letters. In addition, the lockbox bank sends to Company A information regarding invoices and the checks it received and deposited (this information can be sent either electronically or manually). Company A must then compare the data received from the lockbox bank with its own records (accounts receivable ledger), and determine/resolve payment discrepancies (different payment amounts received), as well as resolve disputes and slow-pay situations. A significant amount of the time spent by Company A's receivable department is resolving these payment discrepancies.

Depending on the industry, it is not uncommon that 5-10% of the payments received do not match the invoiced amount, and 2-4% cannot be easily resolved and reconciled (i.e., are easily identifiable as an agreed upon payment discount, volume rebate, etc.). It is very common that the difficult reconciliation problems are the result of communication issues between Company B, the sales force of Company A and its invoicing department, or with return goods. Unresolved items may be outstanding for 90 days or longer before being reconciled, thus the receivable portfolio statistics for many companies are distorted.

If Company A wishes to borrow money against its accounts receivable, or wishes to securitize its accounts receivables, a lender or investor will spend a significant amount of time analyzing the difference between the invoiced amounts and the actual payments received, and focus on the unusual or difficult reconciliation situations. If there are a lot of discrepancies that either cannot be predicted, or take a long time to resolve, the lenders and investors will require additional collateral, or a higher yield to offset the uncertainty. In addition, legal steps to protect the financier or purchaser are time consuming.

Currently, there is not a clearinghouse process that accomplishes a process of matching and reconciliation of payables and receivables information flow between trading partners, allows and facilitates communication between companies regarding specific invoice agreements and adjustments prior to payment, as well as creates a method to finance the payment flows, taking into account legal and cash domain issues.

Nevertheless, large and middle market companies are struggling to efficiently manage their working capital, while trying to reduce borrowing costs, banking fees, and treasury management costs (overall receivable and payable management costs). Current providers of traditional treasury management products continue to lower standard to transaction costs, for payment remittance and receivable collection activity, but this does not address the financing inefficiencies in the current method.

Many companies have funding programs in place based on secured, borrowing bases against receivables, or have sold or securitized their receivables in the capital markets. The continuing growth in the securitization of trade receivables will be dependent upon the ability to improve the efficiency of disseminating trade receivable information and controlling, and/or consolidating, payment methods. In addition, the factoring industry would also be positively and profoundly affected by a more efficient method, such as a clearing center to trade receivable information and cash-flows.

Likely results of a clearinghouse for trade receivables would be more standardized financing documentation and structures, more efficient legal and operational segregation of cash flows, as well as efficiencies that will result in better financing terms for secured borrowers, sellers of receivables, and capital market issuers alike.

SUMMARY OF THE INVENTION

The present invention provides a method and apparatus, such as a clearing center, or central repository of electronic data, for the reconciliation of payable and receivable information, settlement of trade obligations, the financing of receivables, and trading of account receivables and derivations.

One embodiment of the present invention is directed to a method of utilizing an Internet (i.e., decentralized global computer network) based receivable clearinghouse for facilitating a transaction involving invoice information, replacing the need for a separate invoice to be sent between trading partners. The invoice information is sent electronically to the receivable clearinghouse by a first participant. The clearinghouse stores the invoice information and generates an electronic version of the invoice. The invoice information is provided or made available by the clearinghouse to a second participant on behalf of the first participant. The electronic invoice information includes one or more payment terms wherein one term requires payment of the amount due under that specific invoice be sent to the receivable clearinghouse. Payments by the second participant are received at the clearinghouse and recorded. The first participant is credited with the receipt of the payment.

A further aspect of the present invention provides a process for modifying the one or more payment terms. A confirmation (formal agreement with like terms an obligations of the invoice) of the specific invoice can be provided by the second participant, and sent to the clearinghouse wherein the clearinghouse forwards the confirmation to the first participant. In response to the confirmation, one or more of the payment terms may be modified, i.e., discounted amount, or extended payment terms, etc.

Another aspect of the present invention provides for daily net settlements and reporting between the participant and the receivable clearinghouse covering all of its payables and receivables due to/from other participants.

Yet another further aspect of the present invention provides for a marketplace for the offering of financing or purchasing of receivables tracked by the clearinghouse. The offers can be predetermined or confidential, e.g., "blind," arrangements extended to participants owning receivables.

Other features and advantages of the invention will be apparent from the following specification taken in conjunction with the following drawings.

DETAILED DESCRIPTION OF THE PREFERRED EMBODIMENT

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

Figure 2:
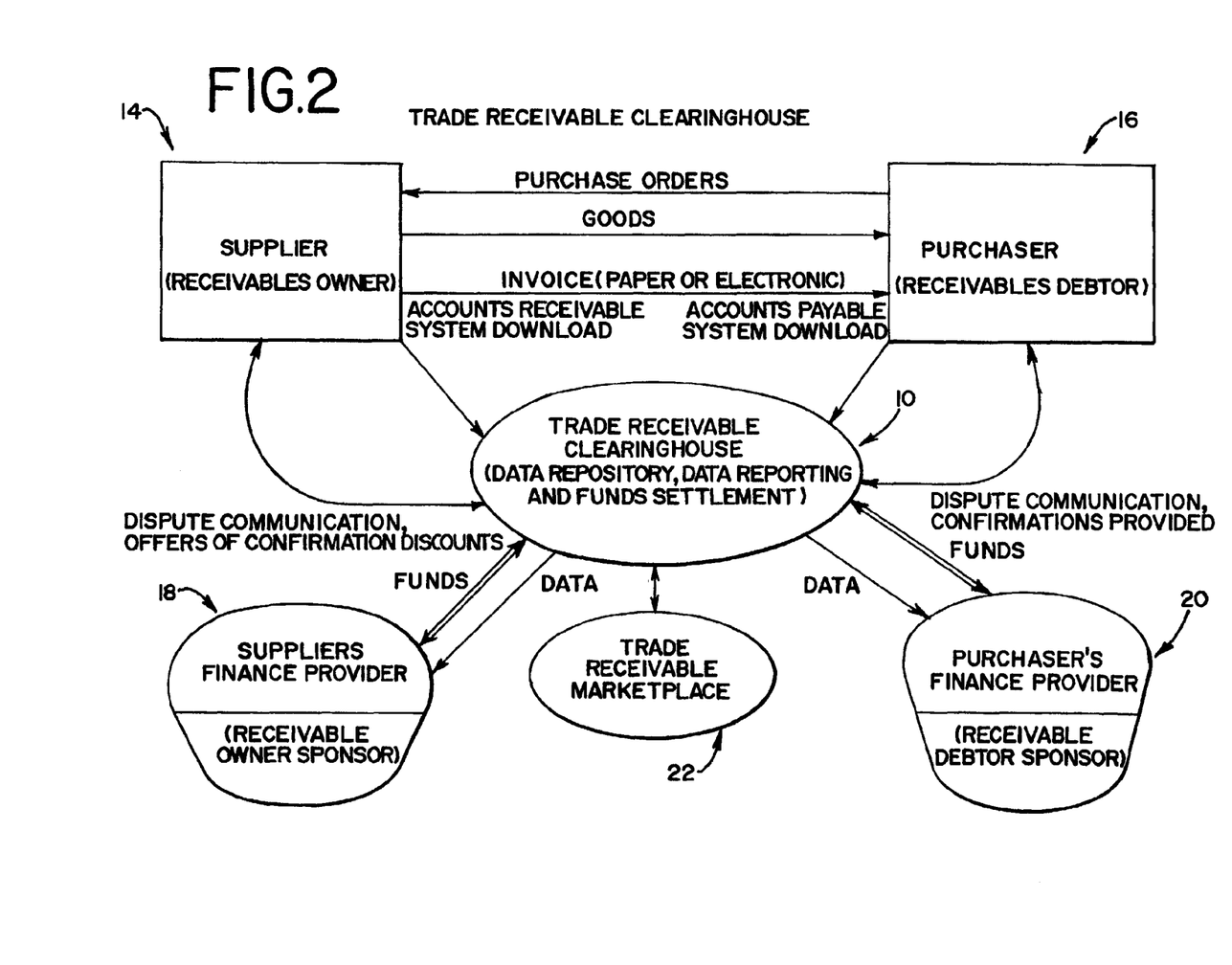
FIG. 2 is a simplified flow diagram of a business transaction utilizing a trade receivable clearing process in accordance with the present invention; and, FIG. 3 is a simplified block diagram of the trade receivable clearing process depicted in FIG. 2.
Figure 3:
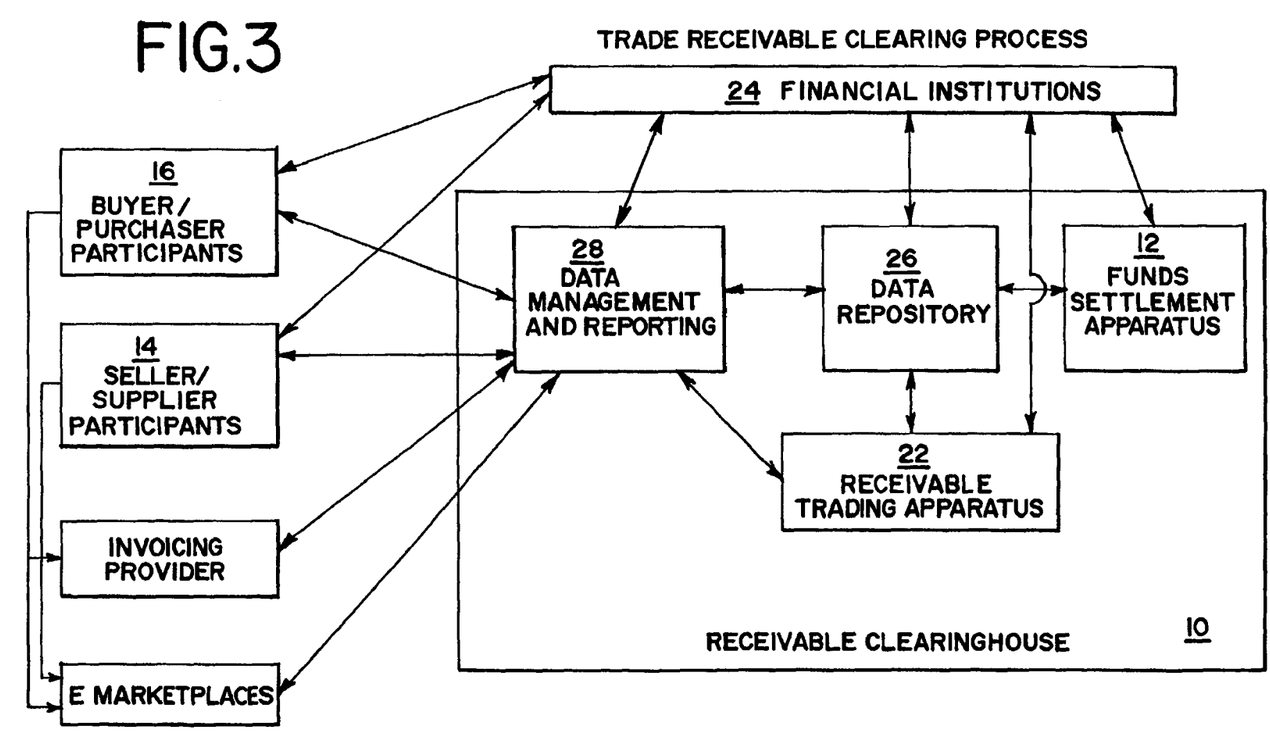

An embodiment of a business transaction utilizing a receivable clearinghouse 10 in accordance with the present invention is shown in FIGS. 2 and 3. Preferably, the clearinghouse 10 is Internet (i.e., decentralized global computer network) based and capable of interacting with several participants including suppliers, purchasers, and finance providers. Specifically, the participants share data related to trade obligations created during the transaction of business to business commerce, and changes or corrections to the trade obligations. The participants enter into contractual relationships with regard to the actual settlement and financing of these obligations. Preferably, these agreements are standard between the clearinghouse and all other participants including finance providers and prospective investors in trade receivables.

Turning to FIG. 3, the clearinghouse 10 preferably includes a funds settlement apparatus 12, such as a receivable trust, utilized by the clearinghouse and all its participants. Cash settlements between the clearinghouse 10 and its participants preferably occurs daily. In an embodiment, several types of participants utilize the clearinghouse 10 such as receivable owners, receivable debtors, and financial providers.

The receivable owner, e.g., supplier 14, agrees to provide summary data on its receivables and settle certain of its trade receivables through the clearinghouse 10. Similarly, the receivable debtor, e.g., purchaser 16, has agreed to provide summary data on its payables and settle its trade obligations via the clearinghouse 10.

As shown in FIG. 2, two additional participants can include the supplier's finance provider 18 and the purchaser's finance provider 20. In an embodiment, besides providing financing to the supplier 14, the supplier's finance provider 18 is a financial institution that agrees to take on the performance risk of the receivable owner 14 for certain representations and warrants for which it agreed to when becoming a clearinghouse participant. In addition, the supplier's finance provider 18 may act as the representative of the receivable owner 14 when the receivable owner trades through a clearinghouse trade receivable marketplace 22.

Likewise, in an embodiment, the purchaser's finance provider 20 is a financial institution that, along with providing financing, agrees to take on the performance risk of the receivable debtor 16 for certain representations and warrants for which it agreed to when becoming a clearinghouse participant. Moreover, the purchaser's finance provider debtor sponsor 20 may act as the representative of the receivable debtor 16 when the receivable debtor executes a trade through the clearinghouse trade receivable marketplace 22.

In an embodiment, one or more other financial institutions 24 may offer to provide financing to the receivable owner 14, as well as coordinate cashflow to and from the clearinghouse 10 on behalf of the participants. Such financing can be provided, for example, through the purchase of the debt obligations of the purchaser 16 owing to the supplier 14, or through the lending of funds to the purchaser or subsequent owner secured by the purchaser obligations. They may also provide currency exchange products and services. The financial institutions 24 preferably agree to the legally binding transfer of ownership and assignments of security interests as reflected in the records of the clearinghouse 10.

The clearinghouse trade receivable marketplace 22 provides a forum within the clearinghouse 10 that allows financial institutions 24, on their own behalf as well as on behalf of the current owner of a receivable, to buy or sell an obligation of the purchaser 16 to make a payment under a specific receivable to other clearinghouse participants.

Preferably, a contractual relationship is a prerequisite to a participant's participation within the clearinghouse 10. Participants agree to resolve receivable and payable disputes through the clearinghouse 10, track their resolution, and be bound by execution of a digital signature. The participants further agree to follow predetermine reporting and funding procedures. These procedures can include: summary information on receivables to be settled through the clearinghouse 10; notification of receivable ownership/interest changes; and, notification of debit/credit balances in the funds settlement apparatus 12.

In an embodiment, each participant acknowledges the ability of the clearinghouse to track and grant security interests in receivables and the funds in settlement apparatus 12 on behalf of the supplier 14, or the current receivable owner, if different. The transfer of ownership in the receivables and payment obligations, and the granting of security interests are authorized by the execution of an electronic signature. The supplier 14 and purchaser 16 are preferably bound to provide predetermined information on receivables and payables to each other through the clearinghouse 10. The receivables and payables information are matched and tracked through the clearinghouse 10, preferably via the data management and reporting module 28. The supplier 14, or subsequent owner of the receivables, agrees to accept payment for the receivables through the funds settlement apparatus 12, e.g., the receivable trustee transfers funds from the receivable debtor 16 designated accounts to the receivable owners designated accounts at the receivable trust 12. Similarly, the receivable debtor 16 will make a payment of all of its payables to a designated account at the receivable trust 12.

The supplier 14 (receivable owner) and purchaser 16 (receivable debtor) electronically communicate with the clearinghouse 10 the status of receivables and payables. Preferably, these electronic communications to and from the clearinghouse 10 are legally binding contractual obligations. The status of a clearinghouse item may be: no-match, match, approved release date, confirmed (i.e., receivable debtor will pay the stated amount on the stated date), re-confirmed (i.e., the receivable debtor's obligation is backed or guaranteed by a financial institution), etc. In an embodiment, the payment date is the actual date payment is made. Preferably, the funds settlement trust 12 has the ability to net payments of a participant's receivable and payable accounts. These net payments are preferably executed on a daily basis.

Upon the confirmation of an invoice amount (when the receivable debtor 16 specifically agrees to pay a certain amount on a certain date), the receivable debtor agrees that the obligation thereafter is absolute, binding, with no rights of set-off. In addition, the receivable debtor 16 acknowledges that the receivable owner 14 may sell, assign, pledge, and transfer ownership within the receivable clearinghouse 10 without the consent or knowledge of the receivable debtor. The supplier 14, or a subsequent receivable owner, can offer the cashflow obligations of the receivable debtor 16 to other participants of the clearinghouse 10 on a confidential "double-blind" basis, i.e., confidential regarding underlying business transaction as well as the supplier 14 and the prospective receivables purchaser, or receivable owner, through the receivable trading apparatus 22.

The receivable owner 14 and financial provider 18 utilize standard documents for financing receivables. The receivables are financed by the purchase of the receivables, the purchase of an ownership interest in the receivables or a pool of receivables, or the pledging of a security interest. Both the receivable owner 14 and the financial provider 18 agree to accept the risk of clearinghouse bookkeeping regarding ownership and security interest issues. All payments for financing are accepted through book entry debits and credits with the funds apparatus 12 based on the reporting of the clearinghouse 10. In an embodiment, the receivable owner 14 grants access, via the clearinghouse 10, to finance providers, with respect to information pertaining to any receivable for which the financial provider 18 is interested.

Information pertaining to the receivables and payment data is transmitted between the participants and the clearinghouse 10, preferably via data management and reporting 28, on a daily basis. The type of information transmitted depends on the participants involved.

Receivable Owner and Clearinghouse

The supplier 14 sends information on new and existing receivables to the clearinghouse 10. The information sent regarding new receivables may include the purchaser 16, amount, invoice number and date due. The information sent pertaining to existing receivables may involve any of the following: changes requested by the purchaser 16 and accepted or modified; new or revised clearinghouse terms; or, confirmation of the sale of a receivable through the trade receivable marketplace 22. The supplier 14 or a subsequent receivable owner 14 also sends confirmation of settlement to the clearinghouse 10 wherein deposit or withdrawal from the funds apparatus 12 is confirmed.

The receivable owner (whether the original supplier 14 or a subsequent receivable owner) can accesses the clearinghouse marketplace 22 via a trading web-page. At the web-page, the receivable owner can search for receivables to purchase; post receivables to sell; and, inform the clearinghouse 10 of an offer.

The information sent or made available by the clearinghouse 10 to a receivable owner 14, such as the supplier 14, can include: projected future clearinghouse credits; receivable status, i.e., no-match, match, approved, release-date; and, confirmations, reconfirmation, and changes noted or requested by the purchaser 16 related to the current owner or sponsor.

The clearinghouse 10 sends or makes available the receivable owner 14 a daily settlement report. The report contains an itemized net payment due to or from receivables and payables, and the sale of any receivables; and, cash delivery failures on past settlements.

Receivable Debtor and Clearinghouse

The clearinghouse 10 sends or makes available to the receivable debtor 16 information on new invoices which the clearinghouse received from receivable owners 14, e.g., seller, amount, purchase order, product description, terms, clearinghouse terms (discounts offered for affirmations, confirmations, and reconfirmations). In an embodiment, the receivable debtor 16 compares electronically this information with its own accounting system information regarding payables.

The receivable debtor 16 sends to the clearinghouse 10 information on existing payables invoices, such as: affirmations (full or partial); confirmations; and requests for reconfirmation (by receivable debtor sponsor or a specific financial provider). Also sent is information related to changes noted or requested by receivable debtor 16, the current owner or sponsor.

Similar to the information sent or made available to the receivable owner, the clearinghouse 10 sends or makes available the receivable debtor 16 daily settlement reports. The report contains an itemized net payment due on its payables, net of any awards it is to collect if it is also a receivable owner 14, and cash delivery failures on past settlements.

The receivable debtor also sends information pertaining to the confirmation of settlement to confirm payments from the funds apparatus 12.

Financial Provider and Clearinghouse

The clearinghouse makes available daily listings of invoices and information or receivable debtor obligations for those the receivable owner 14 had provided access to the financial provider 24. These listings are categorized by receivable owner 14, receivable debtor 16, and any type of ownership interest guaranteed to the finance provider. The listing by receivable owner is further defined by existing (by type of clearinghouse terms), new additions, and changes to existing invoices. In an embodiment, information such as listings can be made available by the clearinghouse on a global basis by using, for example, the Internet.

The financial provider 24 notifies the clearinghouse 10 of settlement deposit instructions, such as, payment instructions on receivable payments and loan payment instructions to the funds apparatus 12.

The financial provider 24 can access the clearinghouse marketplace 22 via a web page for trading receivables. At the web page, the financial provider 24 can search for receivables to purchase, post offers to sell certain receivables, notify clearinghouse of offers and the acceptance of offers. The financial provider 24 also receives a daily settlement report issued by the clearinghouse 10.

Receivable Owner Sponsor and Receivable Debtor Sponsor and Clearinghouse

The clearinghouse 10 provides a daily report to the receivable debtor sponsor 20 and the receivable owner sponsor 18. Both sponsors are provided information concerning discrepancies relating to the receivable owner or receivable debtor for which it sponsors. The receivable debtor sponsor is further provided with information concerning reconfirmation requests.

In an embodiment, the present invention provides an Internet based clearing center 10 ("Rclearing.com") for tracking, funding, trading and settlement for account receivables, both domestic and international. FIGS. 2 and 3. The Internet based clearing center 10 creates an environment for account payable and receivable processes that significantly lowers traditional processing costs, and allows for more efficient and cost effective financing programs.

Preferably, upon the receipt and initial processing of a purchase order (manually or via Internet, ultimately), and shipping of the goods, the supplier 14 sends new invoice data to Rclearing.com 10 electronically on a daily basis. The invoice information is received by a data repository 26 and Rclearing.com 10 makes available the invoice information to the purchaser 16 on behalf of the supplier 14 via the Internet (email or/and through access to Rclearing.com homepage). Terms of payment are provided in the data, with all payment instructions stating that all payments must be made to "Rclearing.com, Inc.", as nominee for the owner of the receivable (initially supplier 14) via Rclearing's Receivable Trust Account (Preferred) ACH/direct debit (recommended), wire transfer or check (to a lockbox owned by Rclearing, Inc.). The purchaser 16 has previously agreed that the payments due under "Rclearing.com payables" may be (or have been) assigned to a third party. But in any case, all payments by the purchaser 16 are to be made to Rclearing.com 10. In addition, within the electronic data the purchaser 16 may be given the option for a discount or extended payment terms, to confirm the exact dollar amount and date of payment, and waive all rights to additional adjustments or set-off. The size of the discount given by the supplier 14 to the purchaser 16 is negotiable, depending upon the dollar amount of the invoice, the date of payment, as well as the credit quality of the confirming entity (if someone in addition to the purchaser 16 confirms the payment as well, i.e., receivable debtor sponsor 20).

The purchaser 16, individually or with a third party (bank or insurance company), has the option of confirming the invoiced amount, and agreeing to the payment terms (date and amount) in order to receive the agreed upon discount or payment terms on the payment amount.

The supplier 14 may continue to pledge or assign its account receivable, whether or not the purchaser 16 accepts the terms of the "confirmation discount." With the payments from the purchaser 16 required to go through Rclearing.com 10, and with the ability to easily create a confirmation process for some or all of the invoiced amounts, the supplier 14 will, most likely, receive better terms on its financing from suppliers finance provider 18. Under this process, payments are less volatile, and cash receipts are easily segregated away from the supplier 14, if necessary.

All payable and receivable information is transferred directly to/from the seller's (supplier 14) and the buyer's (purchaser 16) MIS systems (including accounts payable and accounts receivable systems) to Rclearing.com 10. Rclearing.com will provide standard interface apparatus for all major vendors of accounting systems.

A large or small company may join Rclearing.com 10, as either a "receivable participant," (receivable owner 14) a "payable participant," (receivable debtor 16), or a "full participant" (both receivable owner and receivable debtor). The participant will access the Rclearing.com website, and, via a password, allow the transfer of data to and from Rclearing.com and the participant's own systems.

As a "full" or "receivable" participant, all invoicing is done through Rclearing.com 10, via the Internet or through traditional means (if the invoiced entity is not yet Internet friendly). Rclearing.com also collects and reports all confirmations received on invoices (if any). All payments received on receivables (electronic or via lockbox-prior to convincing payer that participation in Rclearing or electronic payments is more beneficial) are through Rclearing.com. Rclearing.com credits the participants receivable trust account 12, (funds settlement apparatus) or forwards funds to the participant on a daily basis. If it is a "full" participant, the amount credited to its funds settlement apparatus 12 will be netted against amount owed on payables.

As a "full" or "payable" participant, all invoices received from suppliers 14, as well as all other payable information is electronically forwarded to Rclearing.com 10 (indirectly from the participant as it receives it, or directly from invoicing company—if it is also a "receivable" participant). The payable is acknowledged, and possibly confirmed, by the participant to Rclearing.com giving Rclearing.com payment instructions. Upon availability of funds in the settlement apparatus 12, Rclearing.com will make payments (preferably electronically) to the appropriate party, per the terms of the invoice and confirmation. Daily net settlements and reporting is done between the participants and Rclearing.com.

"Funding Participants," 18, 20, and 24, who may also be full participants, have the ability to purchase or receive security interests in the receivables held by Rclearing.com as nominee. Disclosure arrangements are predetermined between the funding participants and specific other participants.

Upon the request of the participant owning the receivable, confirmed and unconfirmed receivables may be offered by the receivable owner, or its receivable owner sponsor to financial participants 24 for funding prior to payment date via the receivable trading apparatus 22. Predetermined arrangements, as well as independent "blind" offers may be extended by the owner of the receivable via Rclearing.com, and if accepted, funded through Rclearing.com, and the settlement apparatus 12, the next day. The funding scenarios are many. A funding participant 24 may commit to another participant in the form of a loan or purchase arrangement, may purchase receivables as part of building or owning a portfolio of receivables, or may offer to purchase only discrete receivables, from time to time. All full participants may offer to buy discrete receivables using its sponsor through Rclearing.com on a confidential, no-name basis (blind seller, blind buyer).

Standard legal documentation is preferably executed and binding upon any type of participant (including funding participant 24, supplier finance provider 18, and purchaser finance provider 20) for all receivable sales or transfers, and funding arrangements, as a part of becoming a participant of the clearinghouse 10 (both the customer and participating funding providers). This, in itself, may reduce or eliminate significant legal costs for many funding arrangements.

While the specific embodiment has been illustrated and described, numerous modifications come to mind without significantly departing from the spirit of the invention, and the scope of protection is only limited by the scope of the accompanying Claims.

The invention claimed is:
1. A method of utilizing a computer network based receivable clearinghouse for facilitating a transaction involving at least one receivable, the method comprising:
receiving data electronically, over a computer based network, comprising receivable information from a first participant, wherein the receivable information corresponds to at least one receivable;
transmitting the data, over the computer based network, from the first participant to multiple third parties, the data comprising one or more payment terms, which are configured by the first participant;

offering the at least one receivable for sale to the multiple third parties over a receivable marketplace associated with a receivable clearinghouse;

receiving a payment offer for the at least one receivable from at least one of the multiple third parties through the receivable marketplace;

transferring an amount of the payment offer to the first participant, wherein the amount is debited against the at least one of the multiple third parties who made the offer and the amount is credited to the first participant upon acceptance of the payment offer; and storing particulars of the payment electronically in a registry associated with the receivable clearinghouse.

2. The method of claim 1 wherein the payment offer is for an amount less than the invoice corresponding to the receivable.

3. The method of claim 1 wherein the computer based network comprises the Internet.

4. The method of claim 1 further comprising:
modifying the one or more payment terms of the at least one receivable, wherein the modifying is done by the first participant.

5. The method of claim 1, wherein the debit is performed via a direct debit transaction and the credit is performed through a wire transfer or automated clearinghouse transaction.

6. The method of claim 1 further comprising the steps of:
facilitating negotiations between the first participant and the multiple third parties;
coordinating at least one fund settlement between the first participant and the multiple third parties.

7. The method of claim 1 further comprising:
providing several types of participants for participating in the receivable clearinghouse;
the types of participants include:
receivable owner, receivable debtor, receivable owner sponsor, receivable debtor sponsor, and financial provider, the receivable owner providing data on the receivable and being obligated to utilize the receivable clearinghouse to resolve the transaction, the receivable debtor providing data on the receivable and being obligated to utilize the receivable clearinghouse to resolve the transaction, the receivable owner sponsor being a representative of the receivable owner and being obligated to utilize the receivable clearinghouse to resolve the transaction on behalf of the receivable owner, the receivable debtor sponsor being a representative of the receivable debtor and being obligated to utilize the receivable clearinghouse to resolve the transaction on behalf of the receivable debtor, and, the financial provider capable of providing financing to any of the participants through utilizing the receivable clearinghouse.

8. The method of claim 1 wherein the first participant is contractually obligated to abide by the receivable clearinghouse's rules.

9. The method of claim 1 further comprising:
transferring ownership and security interests of the at least one receivable using the receivable clearinghouse.

10. The method of claim 1 further comprising the step of:
transferring ownership of the at least one receivable using the receivable clearinghouse.

11. The method of claim 1 wherein the receivable information received from the first participant comprises:
an amount;
an invoice number; and
a due date.

12. The method of claim 1 wherein the at least one receivable corresponds to an invoice.

13. A method of using a computer network based receivable clearinghouse for facilitating delivery of receivable information, between a first party and multiple third parties, the method comprising:
receiving data electronically, over a computer based network, comprising at least receivable information from a first party, wherein the receivable information corresponds to at least one receivable derived from an invoice;
transmitting the data, over the computer based network, from the first party to multiple third parties, the data comprising one or more payment terms, which are configured by the first participant;
offering the at least one receivable for sale to the multiple third parties over a receivable marketplace associated with a receivable clearinghouse;
receiving a payment offer for the at least one receivable from at least one of the multiple third parties through the receivable marketplace;
transferring an amount of the payment offer to the first party, wherein the amount is debited against the at least one of the multiple third parties who made the offer and the amount is credited to the first party upon acceptance of the payment offer; and
storing particulars of the payment electronically in a registry associated with the receivable clearinghouse.

14. A computer network based receivable clearinghouse for facilitating a transaction involving at least one participant and at least one receivable, the computer network based receivable clearing house comprising:
a data repository for holding electronic information corresponding to at least one receivable, wherein the at least one receivable is submitted by at least one participant, and the data repository is accessible to a financial institution of the at least participant;
a fund settlement apparatus for settling discrepancies related to the at least one receivable, the fund settlement apparatus being operably connected to the data repository wherein daily cash settlements between the clearinghouse and the at least one participant occur;
a reconciliation apparatus for reconciling payments and matching receivables at the clearinghouse;
a data management and reporting apparatus for compiling data received from the at least one participant and for reporting data summarized to the at least one participant, the data management and reporting apparatus being operably connected to the data repository; and
a receivable trading apparatus for interacting with a receivable marketplace wherein the at least one receivable can be offered for sale to multiple third party participants of the receivable clearinghouse, the receivable trading apparatus being operably connected to the data repository.

15. The computer network based receivable clearinghouse of claim 14 wherein the computer network based receivable clearinghouse is communicatively coupled to the Internet.

* * * * *